(12) United States Patent
Song et al.

(10) Patent No.: US 10,251,181 B2
(45) Date of Patent: Apr. 2, 2019

(54) METHODS AND APPARATUSES FOR BUFFER STATUS REPORTING FOR DEVICE-TO-DEVICE COMMUNICATIONS

(71) Applicant: Telefonaktiebolaget LM Ericsson (publ), Stockholm (SE)

(72) Inventors: Xinghua Song, Beijing (CN); Shaohua Li, Beijing (CN); Qianxi Lu, Beijing (CN); Stefano Sorrentino, Solna (SE)

(73) Assignee: Telefonaktoebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 15/529,897

(22) PCT Filed: Nov. 27, 2014

(86) PCT No.: PCT/CN2014/092390
§ 371 (c)(1),
(2) Date: May 25, 2017

(87) PCT Pub. No.: WO2016/082159
PCT Pub. Date: Jun. 2, 2016

(65) Prior Publication Data
US 2017/0353950 A1 Dec. 7, 2017

(51) Int. Cl.
*H04W 72/04* (2009.01)
*H04L 1/18* (2006.01)
(Continued)

(52) U.S. Cl.
CPC ............. *H04W 72/048* (2013.01); *H04L 1/18* (2013.01); *H04L 1/1874* (2013.01);
(Continued)

(58) Field of Classification Search
CPC ...... H04W 72/04; H04W 76/023; H04L 5/14; H04L 1/0031; H04L 1/1854; H04L 5/0007; H04L 5/0055
(Continued)

(56) References Cited

U.S. PATENT DOCUMENTS

| | | | |
|---|---|---|---|
| 2009/0075664 A1 | 3/2009 | Rao | |
| 2009/0075668 A1* | 3/2009 | Rao | .................. H04W 72/1221 455/452.2 |

(Continued)

FOREIGN PATENT DOCUMENTS

| | | |
|---|---|---|
| CN | 101541099 A1 | 9/2009 |
| CN | 104104480 A1 | 10/2014 |

(Continued)

OTHER PUBLICATIONS

Xiong (EP 2779743 A1) (Year: 2012).*
(Continued)

*Primary Examiner* — Jae Y Lee
*Assistant Examiner* — Jean F Voltaire
(74) *Attorney, Agent, or Firm* — Sage Patent Group (57) ABSTRACT

Embodiments described herein relate to a wireless device, a method therein for buffer status reporting, a network node and a method therein for assigning resources. The method for the wireless device includes determining an amount of data in the buffer to be transmitted in addition to an amount of data previously transmitted but not acknowledged, transmitting a buffer status report to the network node in which the report includes information on the determined amounts, and receiving from the network node a scheduling assignment for enabling the wireless device to transmit of the unacknowledged data and the remaining data in the buffer.

20 Claims, 5 Drawing Sheets

(51) Int. Cl.
*H04W 72/12* (2009.01)
*H04L 5/00* (2006.01)
*H04W 28/02* (2009.01)
*H04L 1/00* (2006.01)

(52) U.S. Cl.
CPC ....... *H04L 5/0055* (2013.01); *H04W 72/1278* (2013.01); *H04W 72/1284* (2013.01); *H04W 72/1289* (2013.01); *H04L 1/1864* (2013.01); *H04L 2001/0093* (2013.01); *H04L 2001/0097* (2013.01); *H04W 28/0278* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2011/0141983 | A1* | 6/2011 | Hong | H04W 28/0278 370/329 |
| 2012/0044797 | A1 | 2/2012 | Huang et al. | |
| 2015/0163689 | A1* | 6/2015 | Lee | H04W 76/14 370/328 |
| 2016/0095074 | A1* | 3/2016 | Park | H04W 8/005 370/350 |
| 2017/0013634 | A1* | 1/2017 | Tsuboi | H04W 76/14 |

FOREIGN PATENT DOCUMENTS

| | | |
|---|---|---|
| EP | 2 779 743 A1 | 9/2014 |
| WO | WO 2013191353 A1 | 12/2013 |

OTHER PUBLICATIONS

Supplementary European Search Report—EP 14906834.8—dated May 18, 2018—8 pages.
International Search Report and Written Opinion dated Aug. 25, 2015 for International Application Serial No. PCT/CN2014/092390, International Filing Date: Nov. 27, 2014 consisting of 8-pages.

* cited by examiner

METHODS AND APPARATUSES FOR BUFFER STATUS REPORTING FOR DEVICE-TO-DEVICE COMMUNICATIONS

CROSS-REFERENCE TO RELATED APPLICATIONS

This application is a Submission Under 35 U.S.C. § 371 for U.S. National Stage Patent Application of International Application Number: PCT/CN2014/092390, filed Nov. 27, 2014 entitled "METHODS AND APPARATUSES FOR BUFFER STATUS REPORTING FOR DEVICE-TO-DEVICE COMMUNICATIONS," the entirety of which is incorporated herein by reference.

TECHNICAL FIELD

Embodiments herein relate to communications in general and in particular to methods and apparatuses for buffer status reporting for device-to-device (D2D) communications.

BACKGROUND

D2D communication is a well-known and widely used component of many existing wireless technologies, including ad hoc and cellular networks. Examples include Bluetooth and several variants of the IEEE 802.11 standards suite such as WiFi Direct. These systems or technologies operate in unlicensed spectrum.

Recently, D2D communications as an underlay to cellular networks have been proposed as a means to take advantage of the proximity of communicating devices and at the same time to allow devices to operate in a controlled interference environment.

It is suggested that such a D2D communication shares the same spectrum as the cellular system, for example by reserving some of the cellular uplink resources for D2D purposes. Allocating dedicated spectrum for D2D purposes is a less likely alternative as spectrum is a scarce resource and (dynamic) sharing between the D2D services and cellular services is more flexible and provides higher spectrum efficiency.

D2D applications include direct discovery and direct communication. In both cases, the transmitter sends D2D signals that should be directly received at least by the intended receivers. D2D should also be able to operate in multi-carrier scenarios where cellular and/or D2D is configured to operate on multiple carriers. Such carriers do not necessarily belong to a single operator and are not necessarily coordinated and synchronized.

For cellular UEs, a report maybe transmitted in the uplink to a eNB or a base station, the reporting including buffer status of queued but not yet transmitted data at layer 2. The eNB schedules uplink transmission(s) with a suitable transmission format (TF). The eNB then received the uplink transmission including the data. The eNB may further instruct the UE to perform retransmissions of the data when reception and/or detection of the previous transmission attempt fails. A similar principle is also possible in D2D where UEs provide a D2D buffer status report to the eNB and the UEs may transmit data with a TF assigned by the eNB by means of e.g. an uplink grant.

In the evolution of D2D, one suitable mode of operation comprises of splitting the control plane of D2D between a cellular path; where the eNB controls some D2D transmission resources; and a D2D path where D2D capable UEs provide control information directly to each other. In such a mode, the eNB may perform resource allocations for D2D by assigning radio resources and/or TF for D2D transmission on a direct link. If retransmission(s) in the D2D link is supported, the D2D capable UE receiver is configured to send feedback information, e.g. Acknowledgment and Non-Acknowledgement, to the D2D capable UE transmitter over the D2D direct link/path.

A problem arises when the feedback does not reach the eNB and in this case the eNB is not able to allocate the correct amount of resources. In such a scenario, since the eNB controls the allocation of resources, a mismatch may arise between expected D2D link performance and actual D2D link performance. For example, the D2D capable UE transmitter may attempt to retransmit data on resources that have not been allocated or adjusted by the eNB. This leads to an increase in transmission latency and even loss of data.

SUMMARY

An object of embodiments herein is to alleviate at least one of the problems disclosed earlier. The object of embodiments herein comprises providing a method for a user equipment; a user equipment; a method for a network node and a network node.

According to an aspect of exemplary embodiments, at least some of the above stated problems are solved by means of a method for or performed by a first device-to-device capable user equipment, D2DUE, for buffer status reporting, the method comprising: determining an amount of data in a buffer of the first D2DUE to be transmitted to a second D2DUE in addition to an amount of data previously transmitted to the second D2DUE but unacknowledged by the second D2DUE; transmitting a buffer status report, to a network node, the buffer status report comprising information including the determined amounts; and receiving a scheduling assignment from the network node for transmission of the unacknowledged data and the data in the buffer to the second D2DUE via a direct link between the first and second D2DUE.

According to an aspect of exemplary embodiments, at least some of the above stated problems are solved by means of a D2DUE for buffer status reporting, the D2DUE comprising a receiver; a transmitter and a processor. the processor is configured to determine an amount of data in a buffer of the D2DUE to be transmitted to a second D2DUE in addition to an amount of data previously transmitted to the second D2DUE but unacknowledged by the second D2DUE; the transmitter is configured to transmit a buffer status report, to a network node, the buffer status report comprising information including the determined amounts; and the receiver is configured to receive a scheduling assignment from the network node for transmission of the unacknowledged data and the data in the buffer to the second D2DUE via a direct link between the first and second D2DUE.

According to an aspect of exemplary embodiments, at least some of the above stated problems are solved by means of a method for or performed by a network node for assigning resources. The method comprising: receiving a buffer status report from a first device-to-device capable user equipment, D2DUE, the report comprising information including an amount of data in a buffer of the first D2DUE to be transmitted to a second D2DUE in addition to an amount of data previously transmitted to the second D2DUE but unacknowledged by the second D2DUE; and transmitting a scheduling assignment to the first D2DUE for allowing the first D2DUE to transmit the unacknowledged data and the data in the buffer to the second D2DUE via a direct link between the first and second D2DUE.

According to an aspect of exemplary embodiments, at least some of the above stated problems are solved by means of a network node for assigning resources. The network node comprising a transmitter and a receiver: The receiver is configured to receive a buffer status report from a first device-to-device capable user equipment, D2DUE, the report comprising information including an amount of data in a buffer of the first D2DUE to be transmitted to a second D2DUE in addition to an amount of data previously transmitted to the second D2DUE but unacknowledged by the second D2DUE; and the transmitter is configured to transmit a scheduling assignment to the first D2DUE for allowing the first D2DUE to transmit the unacknowledged data and the data in the buffer to the second D2DUE via a direct link between the first and second D2DUE.

An advantage with embodiments herein is that the transmission latency is reduced and that overload of transmission buffer is reduced.

DETAILED DESCRIPTION

The network wherein the embodiments herein are applied may use access technologies supporting D2D communications or UE2UE communications, such as e.g. Long Term Evolution, LTE-Advanced, Wideband Code Division Multiple Access (WCDMA), High Speed Packet Access (HSPA), Worldwide Interoperability for Microwave Access (WiMax), or Ultra Mobile Broadband (UMB), just to mention a few possible implementations. Although the terminology from Third Generation Partnership Project (3GPP) LTE and D2D is used in this disclosure to exemplify the different embodiments, this should not be seen as limiting the scope of the embodiments to only the aforementioned system. Other wireless systems, including WCDMA, UTRA FDD, UTRA TDD, WiMax, WLAN, UMB and GSM/GERAN/EDGE, may also benefit from exploiting the ideas covered within this disclosure.

Also note that terminology such as eNodeB or eNB, and UE or device should be considering non-limiting. Further by transmitter device or transmitter UE is meant a device or a D2D capable UE denoted hereinafter as D2DUE transmitter. Similarly by receiver device or receiver UE is meant a device or a D2D capable UE denoted hereinafter as D2DUE receiver. By network node is meant a radio base station; a eNB, a eNodeB, an access point or any suitable network node capable is serving a cell and UEs.

Figure 1:
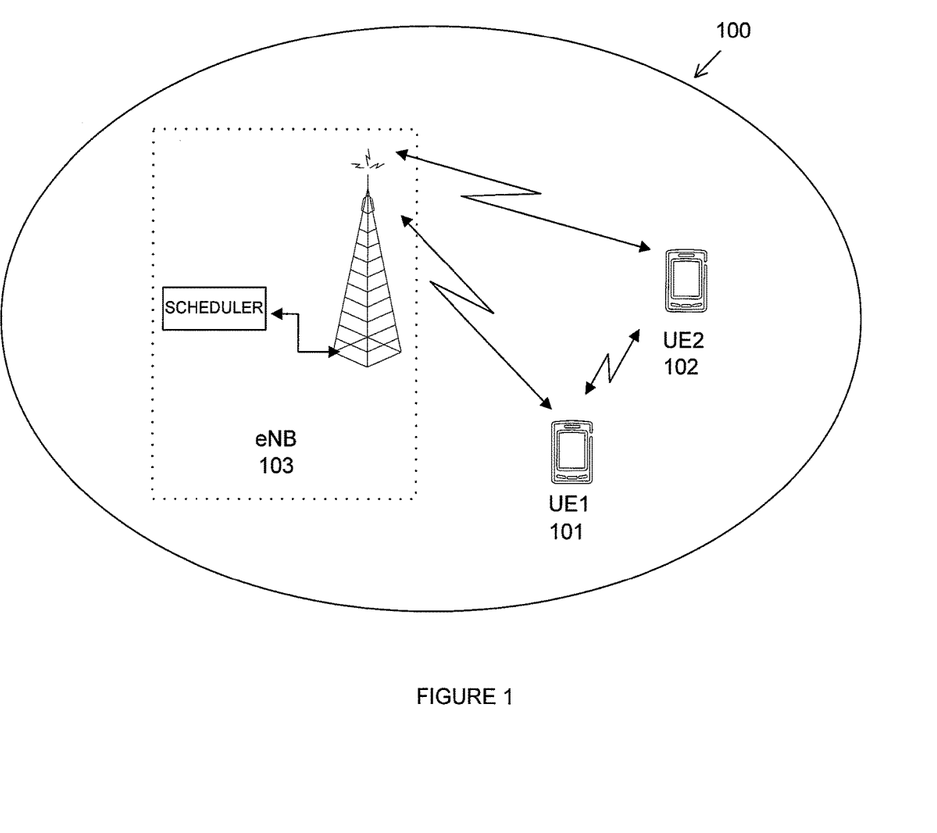
FIG. 1 depicts a network comprising D2D UEs and a network node wherein embodiments herein may be employed.

Referring to FIG. 1 there is illustrated a network 100 wherein embodiments herein may be employed. A first and a second D2DUE are shown and denoted UE 101 and UE 102 respectively. A network node 103 is also shown. A scheduler is also shown connectable to the network node 103. Note however that the scheduler may be an integral part of the network node 103 or is connected to the network node 103 as shown. As mentioned previously, the network node 103 maybe a radio base station e.g. a eNB or eNodeB or an accept point or any suitable network node capable in scheduling resources to user equipments. It should be noted that the number of network nodes and UEs is not restricted to the above. In FIG. 1, it is also illustrated a cell served by the network node 103. As shown, the D2DUEs 101 and 102 may communicate through a wireless connection with the network node 103. This may be viewed as a cellular connection or cellular path. A direct D2D link between the UEs 101 and 102 is also shown. This may be viewed as a direct D2D path.

In the evolution of D2D, one suitable mode of operation comprises of splitting the control plane of D2D between the cellular path; where the network node or eNB 103 controls some D2D transmission resources; and a D2D direct path where D2D capable UEs 101 and 102 provide control information directly to each other. In such a mode, the eNB 103 may perform resource allocations for D2D by assigning radio resources and/or transmission format (TS) for D2D transmission on the direct path. If retransmission(s) in the D2D link/path is supported, the D2D capable UE receiver (e.g. 102) is configured to send feedback information, e.g. Acknowledgment (ACK) and Non-Acknowledgement (NACK), to the D2D capable UE transmitter 101 over the D2D direct link/path.

Reporting ACK/NACKs per packet to the network node may significantly affect the load on the cellular control channels. However, if the D2D link resource allocation or TF selection or other radio resource management decisions are performed at the eNB, some problems may occur. For example, in some cases the D2DUE transmitter may handle automatic repeat request (ARQ) or hybrid ARQ autonomously within resources and TF assigned by the eNB responsible to assign the resources and in that case there may be a mismatch between expected D2D link/path performance and the actual D2D link/path performance which may result in accumulation of unacknowledged packets at the transmitter. This may lead to inefficient utilization of the D2D resources. Furthermore, when data need to be retransmitted, the transmission latency increases unless the resources are adjusted accordingly. After a certain number of retransmissions, the data buffer capacity of the D2DUE transmitter may be exceeded resulting in loss of data.

According to embodiments herein, the problems disclosed above and in the background part are solved by allowing the D2DUE transmitter to provide at least information to the network node about at least data unacknowledged by the D2DUE receiver. This information may be provided to the network node assisting the D2DUE transmitter in the radio resource management decisions and TF in a buffer status report.

This may be achieved in different ways. For example by allowing the D2DUE transmitter, or a first D2DUE in general, to transmit a buffer status report including information on an amount of data in the transmission buffer of the first D2DUE that has not yet been transmitted to the intended D2DUE receiver, or a second D2DUE in general, and also, in the same buffer status report, indicate an amount of data that has already been transmitted to the second D2DUE but not (yet) acknowledged by the second D2DUE. It is here considered the exemplary case where the first and second D2DUEs are communication via the direct D2D path/link. The two amounts of data may be combined. The two amounts may also be combined with different coefficients.

An example of a coefficient is a function of the number of transmission attempts for a certain (amount of) data packet(s) or any other parameter that may be related to the likelihood that the transmission will success at the next transmission attempt.

According to another example, the first D2DUE may provide information to the eNB about data that has already been transmitted at least once but still unacknowledged and/or provide information about a characteristic of the transmission. An example of the characteristic of the transmission maybe:

- a number of ACKs or NACKS associated to previously (scheduled) data transmissions. The network node or eNB may then calculate how data has been acknowledged and how much data is still pending in the buffer of the first D2DUE.
- a summary (e.g. a bitmap or a list) of acknowledgment results of previously transmitted data (packets). This may also be used by the eNB to calculate how data has been acknowledged and how much data is still pending in the buffer.
- associated D2D transmission format and/or resource allocation parameters. An example of a transmission format parameter may be a modulation and coding scheme (MCS) information used by the first D2DUE. The MCS information may be used the eNB to predict the resources required for D2D transmissions. It should be noted that the first D2DUE may adjust the MCS based on feedback received from the second D2DUE to better adapt to the direct link. Another example of a parameter is the block error rate (BLER) given the used MCS. The BLER may be determined based on the number of ACKs and/or NACKs. Another example of a useful parameter is the channel state information (CSI) of the D2D channel. The CSI may be channel quality information (CQI) and/or a precoding matrix indicator (PMI) and/or a rank indicator (RI). Another parameter may be the number of attempted transmissions.

When the eNB or network node or the scheduler of the eNB receives the buffer status report from the first D2DUE, the eNB (or the scheduler) may adapt the TF and/or resource allocation in such a way that the amount of unacknowledged data in the buffer status report is taken into account when assigning resources to the D2DUE(s). The eNB (or the scheduler) may also take into account the amount of data that the first D2DUE has in its buffer but not yet transmitted to the second D2DUE. The eNB may further transmit a scheduling assignment to the first D2DUE for allowing the first D2DUE to transmit the unacknowledged data and the data not yet transmitted to the second D2DUE though the direct D2D path/link. Hence, the eNB allocates or assigns sufficient resources for transmission of both the new and the acknowledged data. If the D2D direct link is underutilized e.g. because most or all data packets were successfully received by the second D2DUE, the eNB may allocate or assign more aggressive transmission parameters for the D2D link. By aggressive parameters is meant higher MCSs; higher transmit power control commands; less time and frequency resources etc.

Figure 2:
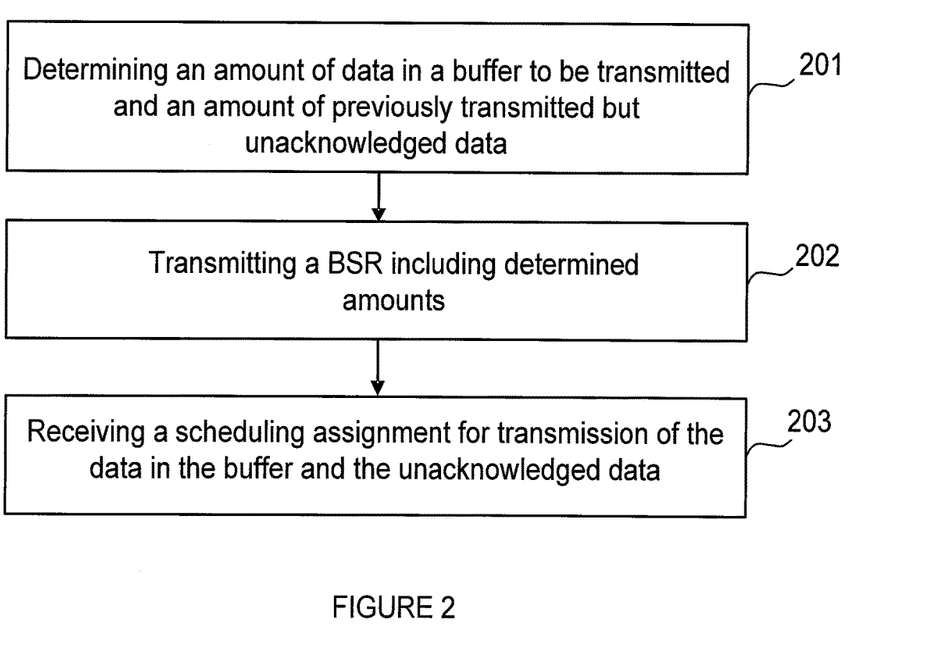
FIG. 2 illustrates a method for a D2DUE in accordance with some exemplary embodiments herein.

FIG. 2 illustrates a method performed by or for a first D2DUE for buffer status reporting in accordance with some exemplary embodiments described above.

As shown the method comprises: determining 201 an amount of data in a buffer of the first D2DUE to be transmitted to a second D2DUE in addition to an amount of data previously transmitted to the second D2DUE but unacknowledged by the second D2DUE; transmitting 202 a buffer status report (BSR), to a network node or a scheduler of a network node, the BSR comprising information including the determined amounts; and receiving 203 a scheduling assignment from the network node for transmission of the unacknowledged data and the data in the buffer to the second D2DUE via a direct link between the first and second D2DUE.

According to an embodiment and as previously described, the information in the buffer status report may comprise a number of ACKS and NACKS associated to previously data. For example, assume that 10 data packets (e.g. Packet Data Units (PDUs)) are scheduled for transmission, via the D2D direct link, to the second D2DUE. The scheduler of the eNB has allocated the resources necessary for transmission of the 10 data packets. The first D2DUE transmits 9 data packets and then receives 5 ACKs and 4 NACKs. This information i.e. (5 ACKs+4 NACKs) may be transmitted to the scheduler of the network node in a buffer status report. So the eNB may calculate that one packet has not yet been transmitted and based on that information the eNB (or the scheduler) may adapt the scheduling and inform the first D2DUE of the adapted scheduling assignment allocating enough resources to the first D2DUE to retransmit the 4 NACK:ed packets and the one in the buffer (that has not been transmitted). As another example, assume that 6 out of 10 data packets have been transmitted but zero ACKs or zero NACKs were received from the second D2DUE. In that case, the first D2DUE may inform in the buffer status report that 6 data packets were unacknowledged and 4 packets are still waiting for transmission to the second D2DUE. The eNB/scheduler may then allocate to the first D2DUE resources for allowing the first D2DUE to retransmit the 6 packets and the 4 packets to the second D2DUE. It should be mentioned that a timer at the first D2DUE may be used to determine how long the D2DUE should wait before reporting the amount of data that was transmitted but not acknowledged. According to another embodiment, the eNB may request the D2DUE(s) to provide a buffer status request in a regular basis (e.g. periodically).

According to an exemplary embodiment, the information in the buffer status report may comprise other information, e.g. information on a modulation and coding scheme (MCS) that the first D2DUE is using. It should be noted that the first D2DUE may adapt the MCS to adapt to the quality of the link. For example, assume that the first D2DUE was using 64 QAM (Quadrature Amplitude Modulation) as modulation type. If the quality of the radio link becomes bad (i.e. drops below a threshold), the first D2DUE may instead adapt the modulation to a more robust one e.g. to BPSK (Binary Phase Shift Keying). The first D2DUE may then inform the scheduler of the eNB of the new MCS (or new modulation). The scheduler understands or predicts from this information that the radio link is relatively bad and the scheduler may then allocate the required resources and inform the first D2DUE about the (new) allocation. Other useful parameters that may be indicated in the report are, as indicated previously, the CSI of the D2D channel; or the number of attempted transmissions to the second D2DUE. A transmit power used by the first D2DUE may also be transmitted to the scheduler of the eNB in the report. The scheduler may then adapt the D2D power control parameter. For example, the eNB may instruct the D2DUE to reduce or increase it power for subsequent transmissions.

It should be mentioned that the resources that the network node or the scheduler of the network node assigns to the D2DUE(s) may include time slots and/or frequencies bands (e.g. subcarriers) to be used for the D2D direct path. These assigned resources are not used by the network node in the downlink directions. In other words, in order to avoid interference, these resources are reserved/dedicated for the direct link communication between the D2DUEs. Such assignments may be indicated in a physical uplink control channel transmitted by the network node.

Several advantages are achieved by the teaching of the described embodiments. For example, the transmission latency is decreased since the network node (or the scheduler) is made aware by means of the buffer status report, of the amount of data to be transmitted by the first D2DUE to the second D2DUE and is also made aware of the data that has been transmitted from first D2DUE but not acknowledged by the second D2DUE. This will allow the network node to adjust or adapt the scheduling accordingly and therefore the transmission latency is reduced.

Another advantage is that the scheduler of the network node has better control of the resource assignment for D2D direct link communications between D2DUEs. For example, if the buffer status report indicates that all transmitted data has been acknowledged by the second D2DUE, the scheduler predicts that the D2D link exceeds a predefined threshold e.g. 20 dB and in that case may instruct the D2DUEs to reduce the transmission power or MCS and as a consequence interference is decreased.

Figure 3:
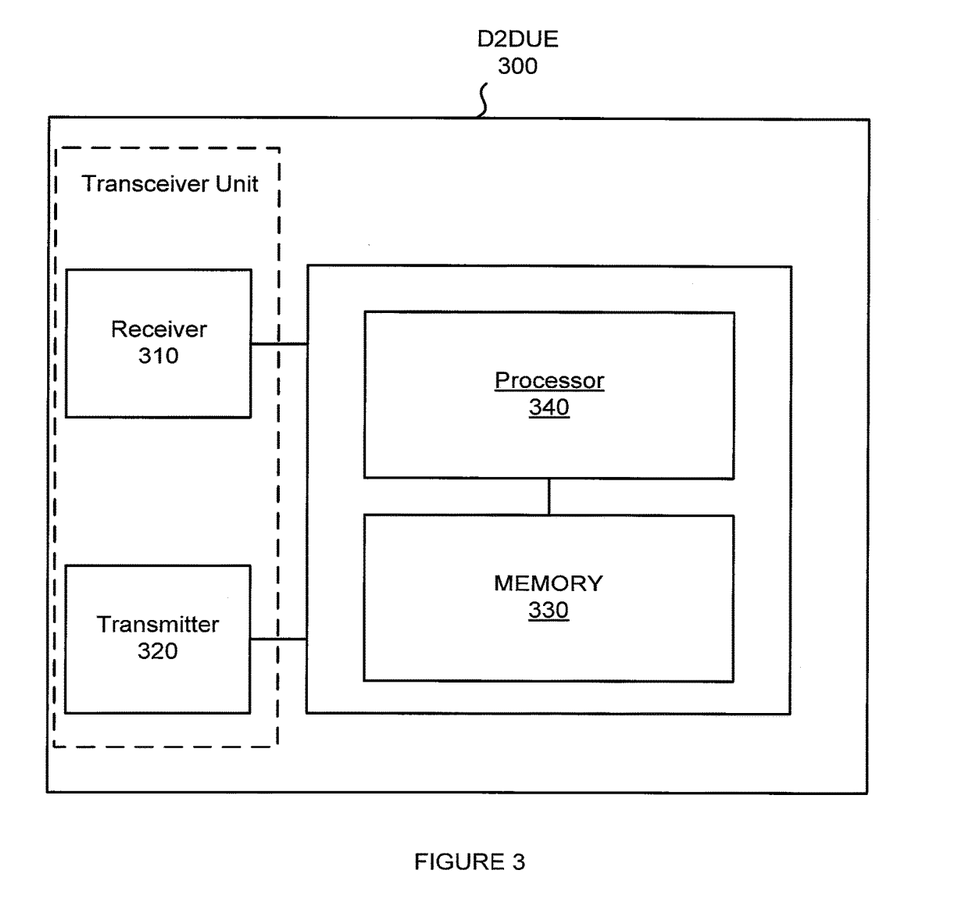
FIG. 3 illustrates a block diagram depicting a D2DUE according to exemplary embodiments herein.

FIG. 3 illustrates, an exemplary block diagram depicting a wireless device (first D2DUE) 300 for buffer status reporting according to exemplary embodiments herein. The device 300 comprises a receiver 310 or receiver unit/circuit or receiver module; a transmitter 320 or transmitter unit/circuit or transmitter module which may be combined with the receiver 310 to form a transceiver or transceiver unit/circuit or module. The device 300 further comprises a memory 330 or memory unit or memory module and a processor 340 processor unit/circuit or processing module.

The memory 330 comprising instructions executable by the processor 340 whereby the device 300 is operative: to determine an amount of data in a buffer (not shown) of the device (e.g. first D2DUE) to be transmitted to a second device (e.g. the second D2DUE) in addition to determining an amount of data previously transmitted to the second D2DUE but unacknowledged by the second D2DUE; to transmit a buffer status report, to a scheduler of a network node, the buffer status report comprising information including the determined amounts; and to receive a scheduling assignment from the network node for transmission of the unacknowledged data and the data in the buffer to the second D2DUE via a direct link between the first and second D2DUE. The information further comprises a number of ACKs and NACKs associated to previously scheduled data.

The processor or processing unit/circuit or module 340 is thus configured to determine an amount of data in a buffer of the device (e.g. first D2DUE) to be transmitted to a second device (e.g. the second D2DUE) in addition to determining an amount of data previously transmitted to the second D2DUE but unacknowledged by the second D2DUE. The transmitter unit/circuit or module 320 is configured to transmit a buffer status report, to a scheduler of a network node, the buffer status report comprising information including the determined amounts; and the receiver unit/circuit or module 310 is configured to receive a scheduling assignment from the network node for transmission of the unacknowledged data and the data in the buffer to the second D2DUE via a direct link between the first and second D2DUE.

As previously described, the information may further comprise information on a modulation and coding scheme used by the first D2DUE and/or a channel state information of the D2D direct link between the first and second D2DUE. The information may further comprise a number of attempted transmissions to the second D2DUE. Additional details have already been described and are therefore not repeated.

The D2DUE 300 may comprise additional units/circuits/modules which are not shown, e.g. an antenna, an input device(s) circuit/unit, an output device(s) circuit/unit, interfaces and a bus etc.

Figure 4:
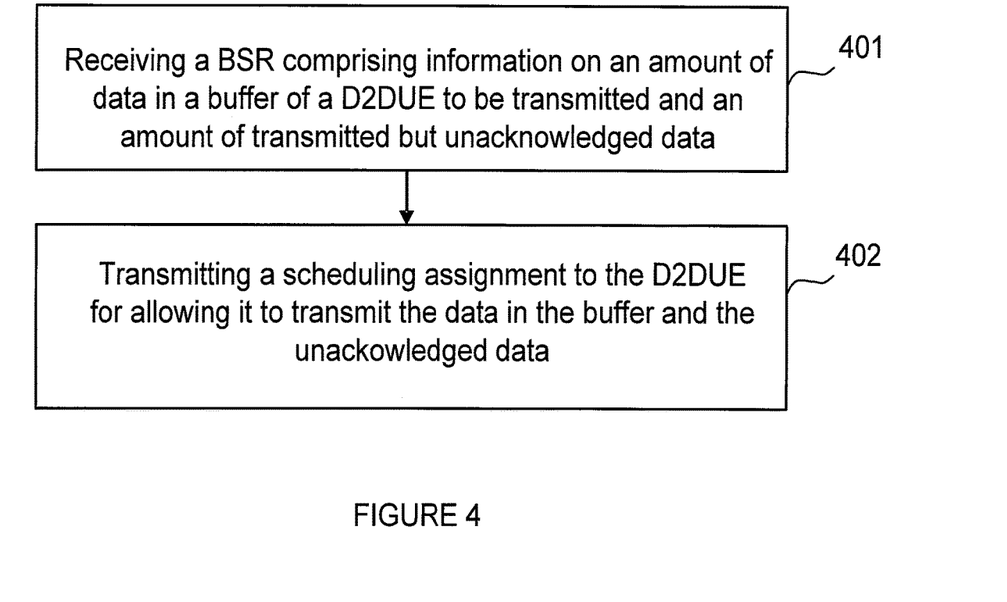
FIG. 4 illustrates a method for a network node in accordance with some exemplary embodiments herein.

Referring to FIG. 4 there is depicted a method performed by or for a network node for assigning resources in accordance with some exemplary embodiments described above.

As shown the method comprises: receiving 401 a buffer status report (BSR) from a device (e.g. first D2DUE), the report comprising information including an amount of data in a buffer of the first D2DUE to be transmitted to a second D2DUE in addition to an amount of data previously transmitted to the second D2DUE but unacknowledged by the second D2DUE; and the method further comprises: transmitting 402 a scheduling assignment to the first D2DUE for allowing the first D2DUE to transmit the unacknowledged data and the data in the buffer to the second D2DUE via a direct link between the first and second D2DUE. The information in the buffer status report may comprise a number of ACKs and NACKs associated to previously scheduled data. The information may further comprise information on a modulation and coding scheme used by the first D2DUE and/or the information may comprise a channel state information of the D2D direct link between the first and second D2DUE. The information may further comprise a number of attempted transmissions to the second D2DUE. Additional details have already been described.

Figure 5:
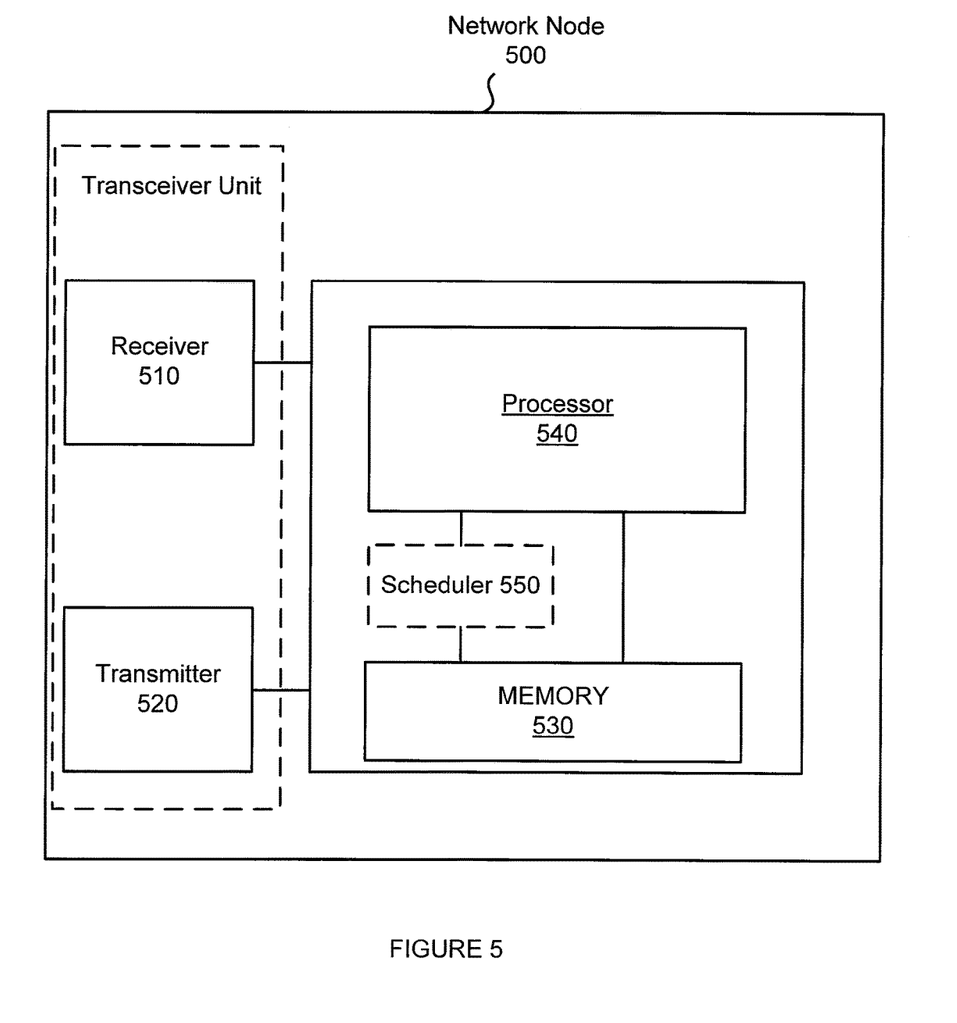
FIG. 5 illustrates a block diagram depicting a network node in accordance with some exemplary embodiments herein.

FIG. 5 illustrates, an exemplary block diagram depicting a network node 500 for assigning resources according to exemplary embodiments herein. The network node 500 comprises a receiver 510 or receiver unit/circuit or receiver module; a transmitter 520 or transmitter unit/circuit or transmitter module which may be combined with the receiver 510 to form a transceiver or transceiver unit/circuit or module. The network node 500 further comprises a memory 530 or memory unit or memory module a processor 540 processor unit/circuit or processing module and a scheduler 550. The scheduler 550 may be part of the processor 540 or be a separate block/unit/circuit/module (as shown) in the network node 500 or the scheduler may be connected to the network node 500.

The memory 530 comprising instructions executable by the processor 540 whereby the network node 500 is operative: to receive a buffer status report from a device (e.g. first D2DUE), the report comprising information including an amount of data in a buffer of the first D2DUE to be transmitted to a second D2DUE in addition to an amount of data previously transmitted to the second D2DUE but unacknowledged by the second D2DUE; and to transmit a scheduling assignment to the first D2DUE for allowing the first D2DUE to transmit the unacknowledged data and the data in the buffer to the second D2DUE via a direct link between the first and second D2DUE. The network node 500 by means of the scheduler is 550 hence configured to schedule and allocate resources.

The receiver unit/circuit or module 510 is thus configured to receive a buffer status report from the device (e.g. first D2DUE), the report comprising information including an amount of data in a buffer of the first D2DUE to be transmitted to a second D2DUE in addition to an amount of data previously transmitted to the second D2DUE but unacknowledged by the second D2DUE; and transmitter circuit/ unit or module 520 is configured to transmit a scheduling assignment to the first D2DUE for allowing the first D2DUE to transmit the unacknowledged data and the data in the buffer to the second D2DUE via a direct link between the first and second D2DUE. As mentioned above the network node 500 by means of the scheduler is configured to schedule and allocate the required resources.

In the buffer status report the information may further comprise information on a modulation and coding scheme used by the first D2DUE and/or channel state information of the D2D direct link between the first and second D2DUE. The information may further comprise a number of attempted transmissions to the second D2DUE. Additional details have already been described and are therefore not repeated.

It should be mentioned that the embodiments herein may be implemented through one or more processors or processing units e.g. processing circuit or unit of the device 300 (e.g. first D2DUE) together with a computer program code for performing the functions and/or method steps of the embodiments. For example, a computer program (CP) comprising instructions which, when executed on at least one processor, cause the at least one processor to carry out the method performed by the D2DUE 300 as described earlier and in conjunction with FIG. 2 and presented in the appended claims relating to the method for the D2DUE 300. Also here a carrier containing the computer program (CP) is provided, wherein the carrier is one of an electronic signal, optical signal a radio signal or a computer readable storage medium.

It should also be mentioned that the embodiments herein may be implemented through one or more processors or processing units e.g. processing circuit or unit of network node 500 (e.g. eNB) together with a computer program code for performing the functions and/or method steps of the embodiments. For example, a computer program comprising instructions which, when executed on at least one processor, cause the at least one processor to carry out the method performed by the network node 500 as described earlier and in conjunction with FIG. 4 and presented in the appended claims relating to the method for the network node 500. Also here a carrier containing the computer program is provided, wherein the carrier is one of an electronic signal, optical signal, a radio signal or a computer readable storage medium. The network node 300 may comprise additional units/circuits/modules which are not shown, e.g. an antenna, an input device(s) circuit/unit, an output device(s) circuit/unit, interfaces and a bus etc.

The various "circuits" or "units" or "modules" described may refer to a combination of analog and digital circuits, and/or one or more processors configured with software and/or firmware (e.g., stored in memory).One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

What is claimed is:

1. A method for a first device-to-device capable user equipment, D2DUE, for buffer status reporting, the method comprising:

determining an amount of data in a buffer of the first D2DUE to be transmitted to a second D2DUE in addition to an amount of data previously transmitted to the second D2DUE but unacknowledged by the second D2DUE;

transmitting a buffer status report to a scheduler of a network node, the buffer status report comprising information including the determined amounts; and receiving a scheduling assignment from the network node for transmission of the unacknowledged data and the data in the buffer to the second D2DUE via a direct link between the first D2DUE and the second D2DUE.

2. The method according to claim 1, wherein the information further comprises a number of ACKs and NACKs associated to previously scheduled data.

3. The method according to claim 1, wherein the information comprises at least one from the group consisting of:
information on a modulation and coding scheme used by the first D2DUE; and
a channel state information of the D2D direct link between the first D2DUE and the second D2DUE.

4. The method according claim 1, wherein the information further comprises a number of attempted transmissions to the second D2DUE.

5. A method for a network node for assigning resources, the method comprising:
receiving a buffer status report from a first device-to-device capable user equipment, D2DUE, the report comprising information including an amount of data in a buffer of the first D2DUE to be transmitted to a second D2DUE in addition to an amount of data previously transmitted to the second D2DUE but unacknowledged by the second D2DUE; and
transmitting a scheduling assignment to the first D2DUE for allowing the first D2DUE to transmit the unacknowledged data and the data in the buffer to the second D2DUE via a direct link between the first D2DUE and the second D2DUE.

6. The method according to claim 5, wherein the information further comprises a number of ACKs and NACKs associated to previously scheduled data.

7. The method according to claim 5, wherein the information comprises at least one from the group consisting of:
information on a modulation and coding scheme used by the first D2DUE; and
a channel state information of the D2D direct link between the first D2DUE and the second D2DUE.

8. The method according to claim 5, wherein the information further comprises a number of attempted transmissions to the second D2DUE.

9. A device-to-device capable user equipment, D2DUE, for buffer status reporting, the D2DUE comprising a processor and a memory, the memory comprising instructions executable by the processor to cause the D2DUE to:
determine an amount of data in a buffer of the D2DUE to be transmitted to a second D2DUE in addition to an amount of data previously transmitted to the second D2DUE but unacknowledged by the second D2DUE;
transmit a buffer status report, to a network node, the buffer status report comprising information including the determined amounts; and
receive a scheduling assignment from the network node for transmission of the unacknowledged data and the data in the buffer to the second D2DUE via a direct link between the first D2DUE and the second D2DUE.

10. The D2DUE according to claim 9, wherein the information further comprises a number of ACKs and NACKs associated to previously scheduled data.

11. The D2DUE according to claim 9, wherein the information comprises at least one from the group consisting of:
information on a modulation and coding scheme used by the first D2DUE; and
a channel state information of the D2D direct link between the first D2DUE and the second D2DUE.

12. The D2DUE according to claim 9, wherein the information further comprises a number of attempted transmissions to the second D2DUE.

13. A device-to-device capable user equipment, D2DUE, for buffer status reporting, the D2DUE comprising a receiver; a transmitter and a processor;
the processor being configured to determine an amount of data in a buffer of the D2DUE to be transmitted to a second D2DUE in addition to an amount of data previously transmitted to the second D2DUE but unacknowledged by the second D2DUE;
the transmitter being configured to transmit a buffer status report, to a network node, the buffer status report comprising information including the determined amounts; and
the receiver being configured to receive a scheduling assignment from the network node for transmission of the unacknowledged data and the data in the buffer to the second D2DUE via a direct link between the first D2DUE and the second D2DUE.

14. A network node for assigning resources, the network node comprising a processor and a memory, the memory comprising instructions executable by the processor to cause the network node to:
receive a buffer status report from a first device-to-device capable user equipment, D2DUE, the report comprising information including an amount of data in a buffer of the first D2DUE to be transmitted to a second D2DUE in addition to an amount of data previously transmitted to the second D2DUE but unacknowledged by the second D2DUE; and
transmit a scheduling assignment to the first D2DUE for allowing the first D2DUE to transmit the unacknowledged data and the data in the buffer to the second D2DUE via a direct link between the first D2DUE and the second D2DUE.

15. The network node according to claim 14, wherein the information further comprises a number of ACKs and NACKs associated to previously scheduled data.

16. The network node according to claim 14, wherein the information comprises at least one from the group consisting of:
information on a modulation and coding scheme used by the first D2DUE; and
a channel state information of the D2D direct link between the first D2DUE and the second D2DUE.

17. The network node according to claim 14, wherein the information further comprises a number of attempted transmissions to the second D2DUE.

18. A network node for assigning resources, the network node comprising a transmitter and a receiver;
the receiver being configured to receive a buffer status report from a first device-to-device capable user equipment, D2DUE, the report comprising information including an amount of data in a buffer of the first D2DUE to be transmitted to a second D2DUE in addition to an amount of data previously transmitted to the second D2DUE but unacknowledged by the second D2DUE; and
the transmitter being configured to transmit a scheduling assignment to the first D2DUE for allowing the first D2DUE to transmit the unacknowledged data and the data in the buffer to the second D2DUE via a direct link between the first D2DUE and the second D2DUE.

19. The method according to claim 2, wherein the information comprises at least one from the group consisting of:
information on a modulation and coding scheme used by the first D2DU; and
a channel state information of the D2D direct link between the first D2DUE and the second D2DUE.

20. The method according claim 2, wherein the information further comprises a number of attempted transmissions to the second D2DUE.

* * * * *